United States Patent [19]
Nakamura et al.

[11] Patent Number: 5,942,571
[45] Date of Patent: Aug. 24, 1999

[54] SILICONE RUBBER COMPOSITION FOR USE IN HIGH-VOLTAGE ELECTRICAL INSULATING PARTS AND METHOD FOR MANUFACTURING THE SAME

[75] Inventors: Akito Nakamura; Yasumichi Shigehisa; Yuichi Tsuji, all of Chiba Prefecture, Japan

[73] Assignee: Dow Corning Toray Silicone Co., Ltd., Tokyo, Japan

[21] Appl. No.: 09/014,812

[22] Filed: Jan. 28, 1998

[30] Foreign Application Priority Data

Jan. 29, 1997 [JP] Japan ..................................... 9-031341

[51] Int. Cl.⁶ ....................................................... C08K 5/34
[52] U.S. Cl. .............................. 524/720; 524/91; 524/94; 524/106; 524/779; 524/783; 524/786
[58] Field of Search ................................ 524/94, 91, 106, 524/786, 783, 779, 720

[56] References Cited

U.S. PATENT DOCUMENTS

| | | | |
|---|---|---|---|
| 3,965,065 | 6/1976 | Elliott | 260/37 SB |
| 5,336,916 | 8/1994 | Kunieda et al. | 524/266 |
| 5,691,407 | 11/1997 | Azechi et al. | 524/437 |
| 5,880,199 | 3/1999 | Matsushita et al. | 524/492 |

FOREIGN PATENT DOCUMENTS 62-26124  6/1987  Japan.

*Primary Examiner*—Melvyn I. Marquis
*Attorney, Agent, or Firm*—Jennifer S. Warren

[57] ABSTRACT

A liquid silicone rubber composition for use in high-voltage eletrical insulating parts comprising (A) a polyorganosiloxane containing alkenyl groups, (B) fumed silica, (C) a polyorganohydridosiloxane, (D) a platinum type catalyst, (E) finely powdered aluminum hydroxide, and (F) a powdered metal compound selected from the group consisting of powdered zinc oxide, powdered zinc borate, and powdered magnesium hydroxide and a method for manufacturing such a composition.

19 Claims, No Drawings

SILICONE RUBBER COMPOSITION FOR USE IN HIGH-VOLTAGE ELECTRICAL INSULATING PARTS AND METHOD FOR MANUFACTURING THE SAME

BACKGROUND OF INVENTION

The present invention is a liquid silicone rubber composition. More specifically, the present invention is a liquid silicone rubber composition which has superior weather resistance and mechanical characteristics, as well as good high-voltage electrical insulating characteristics such as tracking resistance, are resistance, and erosion resistance. Examples of possible uses of this composition include anode caps, plug boots, insulators, and flame-retardant electrical wiring.

In the past the mixing of large quantities of inorganic fillers such as powdered aluminum hydroxide, powdered aluminum oxide, or powdered quartz with silicone rubber compositions used in applications requiring high-voltage electrical insulating characteristics, such as anode caps, plug boots, insulators, and flame-retardant electrical wiring has been proposed. For example, in Japanese Patent Application Kokoku No. 53-35982 and U.S. Pat. No. 3,965,056 it is indicated that a silicone rubber composition in which the ordinary electrical insulating characteristics are improved can be obtained by heating a mixture of a polyorganosiloxane which forms a rubber elastic material when cured by heating and an aluminum hydrate for 30 minutes or longer at a temperature exceeding 100° C. Furthermore, it is indicated in Japanese Patent Application Kokai No. 4-209655 that a mixture consisting of a polyorganosiloxane composition which forms an elastomeric material when heat-cured using an organic peroxide, (b) aluminum hydroxide and (c) an organosilane or organosiloxane which has phenyl groups will form a silicone rubber composition with superior high-voltage electrical insulating characteristics. In addition, a silicone rubber composition for use in the covering of electrical wires which consists of a polyorganosiloxane and an inorganic zinc compound is proposed in Japanese Patent Application Kokoku No. 62-26124.

However, in all of these conventional examples the high-voltage electrical insulating characteristics of the silicone rubber materials are still not totally adequate. Furthermore, under conditions of harsh contamination or exposure to the elements deterioration phenomena such as tracking and erosion occur due to high electrical stress so that the high-voltage electrical insulating characteristics show a conspicuous deterioration. Furthermore, silicone rubber compositions obtained by a high degree of filling with the abovementioned inorganic fillers have an extremely high viscosity and are therefore difficult to use in applications requiring fluidity, such as injection-molded materials. Moreover, such compositions also have a low mechanical strength.

Accordingly, a liquid silicone rubber composition which has an appropriate degree of fluidity prior to curing, which is superior in terms of moldability, and which forms silicone rubber molded articles that have good high-voltage electrical insulating characteristics and high mechanical strength following molding is desired.

Specifically, the object of the present invention is to provide a liquid silicone rubber composition which has an appropriate degree of fluidity prior to curing, which is superior in terms of moldability, and which forms silicone rubber molded articles that have high mechanical strength and good high-voltage electrical insulating characteristics following molding.

SUMMARY OF INVENTION

A liquid silicone rubber composition for use in high-voltage electrical insulating parts which comprises (A) a polyorganosiloxane containing alkenyl groups, (B) fumed silica, (C) a polyorganohydridosiloxane, (D) a platinum type catalyst, (E) finely powdered aluminum hydroxide, and (F) a powdered metal compound selected from the group consisting of powdered zinc oxide, powdered zinc borate, and powdered magnesium hydroxide and a method for manufacturing such a composition.

DESCRIPTION OF INVENTION

The present invention is a liquid silicone rubber composition which comprises (A) 100 parts by weight of a polyorganosiloxane comprising at least two alkenyl groups bonded to silicon atoms in each molecule, (B) 1 to 60 parts by weight of fumed silica with a specific surface area of 50 $m^2/g$ or greater, (C) a polyorganohydridosiloxane which has at least two hydrogen atoms bonded to silicon atoms in each molecule in an amount such that the ratio of the number of moles of hydrogen atoms bonded to silicon atoms in component (C) to the number of moles of alkenyl groups bonded to silicon atoms in component (A) is in the range of 0.5:1 to 20:1, (D) a catalytic amount of a platinum type catalyst, (E) 1 to 150 parts by weight of finely powdered aluminum hydroxide, and (F) 1 to 150 parts by weight of a metal compound selected from the group consisting of finely powdered zinc oxide, powdered zinc borate, and powdered magnesium hydroxide, or a liquid silicone rubber composition which is obtained by further mixing (G) 0.001 to 1 part by weight of a triazole compound with a composition consisting of the abovementioned components (A) through (F).

The polyorganosiloxane of component (A) in the present invention is the principal component of the present composition. In order for the composition of the present invention to form a silicone rubber which has rubber elasticity following curing it is necessary that component (A) have two or more alkenyl groups per molecule. Examples of such alkenyl groups include vinyl, allyl, and propenyl. Furthermore, organic groups other than alkenyl groups which may be present in component (A) include substituted or unsubstituted monovalent hydrocarbon groups, for example, alkyl groups such as methyl, ethyl, propyl, butyl, and octyl; aryl groups such as phenyl and tolyl; and halogenated alkyl groups such as 3,3,3-trifluoropropyl and 3-chloropropyl. The molecular structure of component (A) is ordinarily linear, but may also be slightly branched. The alkenyl groups in component (A) may be present on the ends of the molecular chains or on side chains, or on both the ends of the molecular chains and side chains. These alkenyl groups may consist of a single type of alkenyl group or of a mixture of two or more different types of alkenyl groups. The viscosity of component (A) is in the range of 100 mPa·s to 100,000 mPa·s and preferably in the range of 100 mPa·s to 50,000 mPa·s at 25° C. The reason for this is that if the viscosity is too low the strength of the rubber following curing drops. On the other hand, if the viscosity is too high the viscosity of the liquid silicone rubber composition will be excessively high so that the composition is inferior in terms of fluidity.

Concrete examples of the present component (A) include polydimethylsiloxanes which are end-blocked by vinyldimethylsiloxy groups at both ends, dimethylsiloxane-vinylmethylsiloxane copolymers which are end-blocked by vinyldimethylsiloxy groups at both ends, and dimethylsiloxane-methylphenylsiloxane copolymers which are end-blocked by vinyldimethylsiloxy groups at both ends.

Furthermore, polyorganosiloxane resins may also be used as the present component (A) in order to improve the mechanical strength of the cured composition. Examples of such polyorganosiloxane resins include resins consisting of $(CH_3)_3SiO_{1/2}$ units, $(CH_2=CH)SiO_{3/2}$ units and $SiO_{4/2}$ units, resins consisting of $(CH_2=CH)(CH_3)_2SiO_{1/2}$ units and $SiO_{4/2}$ units, and resins consisting of $(CH_2=CH)(CH_3)_2SiO_{1/2}$ units, $(CH_2=CH)SiO_{3/2}$ units, and $SiO_{4/2}$ units.

The fumed silica of component (B) is a reinforcing filler, and is used mainly to improve the mechanical strength of the present composition. In order to improve the mechanical strength of the present composition it is necessary that the specific surface area of the fumed silica be 50 $m^2/g$ or greater. The amount of component (B) that is added is 1 to 60 parts by weight and preferably 10 to 40 parts by weight per 100 parts by weight of component (A). The reason for this is that if the amount of component (B) that is added is too small high physical strength cannot be obtained. Conversely, if the amount of component (B) added is excessively large the fluidity that is a characteristic of liquid silicone rubbers will be lost. Furthermore, as component (B), fumed silica with a specific surface area of 100 $m^2/g$ or greater which has been surface-treated with an organosilicon compound selected from a group consisting of organosilanes, organosilazanes, organosiloxane oligomers, and mixtures of these compounds improves the mechanical strength and is therefore desirable.

The polyorganohydridosiloxane of component (C) acts as a cross-linking agent in the present composition. Specifically, in the presence of the platinum type catalyst of component (D) the hydrogen atoms bonded to silicon atoms in component (C) undergo an addition reaction with the alkenyl groups bonded to silicon atoms in component (A) and as a result the present composition is cross-linked and cured. It is necessary that the polyorganohydridosiloxane of component (C) have at least two hydrogen atoms bonded to silicon atoms in each molecule. Organic groups other than these hydrogen atoms bonded to silicon atones which may be present in component (C) include alkyl groups such as methyl, ethyl, and propyl; aryl groups such as phenyl and tolyl; and substituted alkyl groups such as 3,3,3-trifluoropropyl and 3-chloropropyl, The molecular structure of component (C) may be linear, linear including branching, cyclic, or network-form. There are no particular restrictions on the molecular weight of component (C). However, it is desirable that component (C) have a viscosity at 25° C. of 3 to 10,000 mPa·s. Furthermore, the amount of component (C) that is added to the composition is an amount which is such that the ratio of the number of moles of hydrogen atoms bonded to silicon atoms in component (C) to the number of moles of alkenyl groups bonded to silicon atoms in component (A) is in the range of 0.5:1 to 20:1 and preferably in the range of 1:1 to 1:3. This reason for this is that if this molar ratio is less than 0.5 curing of the present composition becomes insufficient, while if this molar ratio exceeds 20 hydrogen gas is evolved so that foaming occurs.

The platinum type catalyst of component (D) is a catalyst which is used to cure the present composition. Examples of such platinum type catalysts include chloroplatinic acid, alcohol solutions of chloroplatinic acid, complexes of chloroplatinic acid with olefins, complexes of chloroplatinic acid with divinylsiloxane, platinum black, metallic platinum, and catalysts in which metallic platinum is supported on a support. The amount of component (D) that is added varies according to the type of platinum catalyst that is used and is not especially restricted. Ordinarily, however, the amount of component (D) addled is 1 to 1,000 parts by weight as platinum metal and preferably 5 to 100 parts by weight as platinum metal per 1,000,000 parts by weight of component (A).

The finely powdered aluminum hydroxide of component (E) has been confirmed previously as having an effect in improving high-voltage electrical insulating characteristics and is an essential component of the present invention. The amount of component (E) that is added is in the range of 1 to 150 parts by weight per 100 parts by weight of component (A). The reasons for this are as follows: for example, if the amount of component (E) added is less than 1 part by weight sufficient high-voltage electrical insulating characteristics cannot be obtained. On the other hand, if the amount of component (E) added exceeds 150 parts by weight, there is a danger that the mechanical strength of the material will drop. Furthermore, the viscosity of the present composition becomes excessively high when component (E) exceeds 150 parts by weight and the fluidity which is a characteristic of liquid silicone rubbers is lost.

The finely powdered zinc oxide, finely powdered zinc borate, and/or finely powdered magnesium hydroxide of component (F) are ingredients which characterize the present invention. By using these ingredients in combination with component (D) it is possible to achieve a great improvement in the high-voltage electrical insulating characteristics. The amount of component (F) that is added is in the range of 1 to 150 parts by weight and preferably 10 to 100 parts by weight per 100 parts by weight of component (A).

The triazole compound of component (G) shows no significant effect when used alone, but causes a further improvement in the high-voltage insulating characteristics of the present composition when used in combination with the aforementioned components (D) and (E). Examples of such triazole compounds include benzotriazole, 1,2,3-triazole, 1,2,4-triazole, and derivatives of these triazoles. Component (G) has a high melting point and it may be desirable to dissolve this component in an organic solvent such as ethanol, isopropyl alcohol, benzene, toluene, or xylene in order to achieve uniform dispersion of this component in the silicone rubber composition. The amount of component (G) that is added is in the range of 0.001 to 1 part by weight per 100 parts by weight of component (A). The reasons for this are as follows: for example, if the amount of component (G) added is less than 0.001 parts by weight the combined use of this component has no effect. On the other hand, if the amount of component (G) added exceeds 1 part by weight curing tends to be hindered. Furthermore, the addition of a larger amount than 1 part by weight per 100 parts by weight of component (A) shows no corresponding improvement in the effect.

The present composition can easily be manufactured by uniformly mixing prescribed amounts of the abovementioned components (A) through (F) or (A) through (G). There are no particular restrictions on the order in which components (A) through (F) or (A) through (G) are added. However it is desirable to add and mix components (C) and (D) and also component (G) after a silicone rubber base compound has been prepared by heating and mixing components (A), (B), (E) and (F) under reduced pressure and then cooling the resulting mixture.

If necessary, conventional addition reaction inhibiting agents such as ethynylcyclohexanol, dimethylformamide, triphenylphosphine, cyclic vinylmethylsiloxane, 3-methyl-1-butyn-3-ol, 3,5-dimethyl-1-hexan-3-ol, cyclohexylbutynol, 3-phenyl-1-butyn-3-ol, diphenylethynylcarbinol, or 3,5-dimethyl-3-hexen-1-yne may also be added to the present composition.

Furthermore, as long as there is no interference with the object of the present invention, generally known reinforcing fillers, quasi-reinforcing fillers, non-reinforcing fillers, flame-retarding agents, heat-resistant agents, and adhesion enhancing agents may be added to the present composition if necessary.

Next, the present invention will be described in terms of practical examples of application. In these practical examples all parts are parts by weight and all viscosity values shown for polyorganosiloxanes are values measured at 25° C. Measurement of the physical properties of the silicon rubber molded articles obtained was accomplished using the measurement methods stipulated in JIS K6301. Furthermore, in regard to the high-voltage electrical insulating characteristics, a tracking resistance test using the inclined flat plate method was performed using a HAT-520 (manufactured by Hitachi Kasei Kogyo) in accordance with the procedure described in IEC Publ587 (test voltage: 3.5 kV). Determination A and Determination B shown in the tables refer to the following values: the Determination A value is the time (in minutes) required for the current flowing through a high-voltage circuit via the test sample to exceed 60 mA, while the Determination B value is the time (in inunuces) required for tracking to reach a mark formed on the surface of the test sample in a position 25 mm from the lower electrode. Furthermore, erosion was observed visually, and was evaluated according to five grades: slight, minor, moderate, major, and deep.

PRACTICAL EXAMPLE 1

20 Parts of fumed silica with a specific surface area of 200 m²/g, 50 parts of finely powdered aluminum hydroxide, 15 parts of finely powdered zinc oxide, 3 parts of hexamethyldisilazane (used as a surface treatment agent for the fumed silica) and 1 part of water were mixed with 100 parts of a polydimethylsiloxane which was end-blocked by vinyldimethylsiloxy groups at both ends of the molecular chains and which had a viscosity of 10,000 mPa·s (content of vinyl groups bonded to silicon atoms: 0.14 wt %), until a uniform mixture was obtained. This mixture was further heat-treated for 2 hours at 170° C. under a vacuum. Afterward, 1.4 parts of a dimethylsiloxane-methylhydridosiloxane copolymer end-blocked by trimethylsiloxy groups at both ends of the molecular chains (content of hydrogen atoms bonded to silicon atoms: 0.7 wt %) and 10 ppm chloroplatinic acid (calculated as the amount of platinum metal) used as a catalyst were added and uniformly mixed, thus producing a liquid silicone rubber composition.

This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 1.

PRACTICAL EXAMPLE 2

0.3 Parts of a 30 wt % isopropyl alcohol solution of benzotriazole was further added to 100 parts of the liquid silicone rubber composition obtained in Practical Example 1 and these ingredients were uniformly mixed, thus producing a liquid silicone rubber composition 2. This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 1.

COMPARATIVE EXAMPLE 1

A liquid silicone rubber composition was obtained in the same manner as in Practical Example 1, except that the amount of finely powdered aluminum hydroxide added was set at 65 parts and no finely powdered zinc oxide was added. This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 1.

COMPARATIVE EXAMPLE 2

A liquid silicone rubber composition was obtained in the same manner as in Practical Example 1, except that the amount of finely powdered zinc oxide added was set at 65 part and no finely powdered aluminum hydroxide was added. This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 1.

TABLE 1

|  | (parts) | | | |
| --- | --- | --- | --- | --- |
|  | Pr. Ex. 1 | Pr. Ex. 2 | Comp. Ex. 1 | Comp. Ex. 2 |
| Polydimethylsiloxane | 100 | 100 | 100 | 100 |
| Fumed silica | 20 | 20 | 20 | 20 |
| Finely powdered aluminum hydroxide | 50 | 50 | 65 | — |
| Finely powdered zinc oxide | 15 | 15 | — | 65 |
| Hexamethyldisilazane | 3 | 3 | 3 | 3 |
| Water | 1 | 1 | 1 | 1 |
| Dimethylsiloxane-methylhydridosiloxane copolymer | 1.4 | 1.4 | 1.4 | 1.4 |
| Chloroplatinic acid (ppm calculated as amount of platinum metal) | 10 | 10 | 10 | 10 |
| 30% IPA solution of benzotriazole | — | 0.3 | — | — |
| Viscosity of composition (mPa · s) | 180000 | 180000 | 250000 | 160000 |
| Physical characteristics | | | | |
| Hardness (JIS-A) | 40 | 40 | 40 | 40 |
| Tensile strength (kgf/cm²) | 50 | 50 | 45 | 35 |
| Elongation (%) | 500 | 550 | 500 | 350 |
| Tensile rupture strength (A) (kgf/cm) | 14 | 15 | 11 | 10 |

TABLE 1-continued

|  | (parts) | | | |
| --- | --- | --- | --- | --- |
|  | Pr. Ex. 1 | Pr. Ex. 2 | Comp. Ex. 1 | Comp. Ex. 2 |
| High-voltage electrical insulating characteristics (Tracking resistance) | | | | |
| Determination A (min) | more than 360 | more than 360 | 90 | 180 |
| Determination B (min) | more than 360 | more than 360 | 70 | 130 |
| Erosion | Minor | Slight | Major | Deep |

PRACTICAL EXAMPLE 3

20 Parts of fumed .silica with a specific surface area of 200 m²/g, 50 parts of finely powdered aluminum hydroxide, 15 parts of finely powdered zinc oxide, and 3 parts of a dimethylsiloxane oligomer end-blocked by dimethylhydroxysiloxy groups at both ends (used as a surface treatment agent for the fumed silica) were mixed with 100 parts of a polydimethylsiloxane which was end-blocked by vinyldimethylsiloxy groups at both ends of the molecular chains and which had a viscosity of 10.000 mPa·s (content of vinyl groups bonded to silicon atoms: 0.14 wt %), until a uniform mixture was obtained. This mixture was further heat-treated for 2 hours at 170° C. under a vacuum. Afterward, 1.4 parts of a dimethylsiloxane-methylhydridosiloxane copolymer end-blocked by trimethylsiloxy groups at both ends of the molecular chains (content of hydrogen atoms bonded to silicon atoms: 0.7 wt %) and 10 ppm chloroplatinic acid (calculated as the amount of platinum metal) used as a catalyst were added and uniformly mixed, thus producing a liquid silicone rubber composition.

This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 2.

PRACTICAL EXAMPLE 4

20 Parts of fumed Silica with a specific surface area of 110 m²/g which had been surface-treated with dimethyldichlorosilane, 50 parts of finely powdered aluminum hydroxide, and 15 parts of finely powdered zinc oxide were mixed with 100 parts of a polydimethylsiloxane which was end-blocked by vinyldimethylsiloxy groups at both ends of tile molecular chains and which had a viscosity of 10,000 mPa·s (content of vinyl groups bonded to silicon atoms: 0.14 wt %), until a uniform mixture was obtained. This mixture was further heat-treated for 2 hours at 170° C. under a vacuum. Afterward, 1.4 parts of a dimethylsiloxane-methylhydridosiloxane copolymer end-blocked by trimethylsiloxy groups at both ends of the molecular chains (content of hydrogen atoms bonded to silicon atoms: 0.7 wt %) and 10 ppm chloroplatinic acid (calculated as the amount of platinum metal) used as a catalyst were added and uniformly mixed, thus producing a liquid silicone rubber composition.

This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 2.

TABLE 2

|  | (parts) | |
| --- | --- | --- |
|  | Pr. Ex. 3 | Pr. Ex. 4 |
| Polydimethylsiloxane | 100 | 100 |
| Fumed silica | 20 | — |
| Surface-treated fumed silica | — | 20 |
| Finely powdered aluminum hydroxide | 50 | 50 |
| Finely powdered zinc oxide | 15 | 15 |
| Dimethylsiloxane oligomer | 3 | 3 |
| Dimethylsiloxane-methylhydridosiloxane copolymer | 1.4 | 1.4 |
| Chloroplatinic acid (ppm calculated as amount of platinum metal) | 10 | 10 |
| Viscosity of composition (mPa · s) | 250000 | 300000 |
| Physical characteristics | | |
| Hardness (JIS-A) | 40 | 40 |
| Tensile strength (kgf/cm²) | 50 | 50 |
| Elongation (%) | 500 | 500 |
| Tensile rupture strength (A) (kgf/cm) | 14 | 14 |
| High-voltage electrical insulating characteristics (Tracking resistance) | | |
| Determination A (min) | more than 360 | more than 360 |
| Determination B (min) | more than 360 | more than 360 |
| Erosion | Minor | Minor |

PRACTICAL EXAMPLE 5

A liquid silicone rubber composition was obtained in the same manner as in Practical Example 1, except that finely powdered zinc borate was added instead of the finely powdered zinc oxide used in Practical Example 1. This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 3.

PRACTICAL EXAMPLE 6

A liquid silicone rubber composition was obtained by further adding 0.3 parts of a 30 wt % isopropyl alcohol solution of benzotriazolc to 100 parts of the liquid silicone rubber composition obtained in Practical Example 5. This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 3.

COMPARATIVE EXAMPLE 3

A liquid silicone rubber composition was obtained in the same manner as in Practical Example 1, except that the amount of finely powdered zinc borate added was set at 65 parts and no finely powdered aluminum hydroxide was added. This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 3.

TABLE 3

|  | Pr. Ex. 5 | Pr. Ex. 6 | Comp. Ex. 3 |
|---|---|---|---|
|  | (parts) | | |
| Finely powdered aluminum hydroxide | 50 | 50 | — |
| Finely powdered zinc borate | 15 | 15 | 65 |
| 30% IPA solution of benzotriazole | — | 0.3 | — |
| Viscosity of composition (mPa · s) | 150000 | 150000 | 180000 |
| Physical characteristics | | | |
| Hardness (JIS-A) | 40 | 40 | 40 |
| Tensile strength (kgf/cm$^2$) | 50 | 50 | 50 |
| Elongation (%) | 500 | 550 | 550 |
| Tensile rupture strength (A) (kgf/cm) | 15 | 15 | 12 |
| High-voltage electrical insulating characteristics (Tracking resistance) | | | |
| Determination A (min) | more than 360 | more than 360 | 40 |
| Determination B (min) | 180 | more than 360 | 60 |
| Erosion | Moderate | Minor | Major |

PRACTICAL EXAMPLE 7

A liquid silicone rubber composition was obtained in the same manner as in Practical Example 1, except that finely powdered magnesium hydroxide was added instead of the finely powdered zinc oxide used in Practical Example 1. This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 4.

PRACTICAL EXAMPLE 8

A liquid silicone rubber composition was obtained by further adding 0.3 parts of a 30 wt % isopropyl alcohol solution of benzotriazole to 100 parts of the liquid silicone rubber composition obtained in Practical Example 7. This liquid silicone rubber composition was cured by heating for 5 minutes at 150° C., thus producing a sheet-form silicone rubber molded product. The physical characteristics and high-voltage electrical insulating characteristics of this silicone rubber molded product were measured. The results of these measurements are shown in Table 4.

COMPARATIVE EXAMPLE 4

A liquid silicone rubber composition was obtained in the same manner as in Practical Example 1, except that the amount of finely powdered magnesium hydroxide added was set at 65 parts and no finely powdered aluminum hydroxide was added. This liquid silicone rubber composition was cured by heating for 5 minutes at 150° C., thus producing a sheet-form silicone rubber molded product. The physical characteristics and high-voltage electrical insulating characteristics of this silicone rubber molded product were m measured. The results of these measurements are shown in Table 4.

TABLE 4

|  | Pr. Ex. 7 | Pr. Ex. 8 | Comp. Ex. 4 |
|---|---|---|---|
|  | (parts) | | |
| Finely powdered aluminum hydroxide | 50 | 50 | — |
| Finely powdered magnesium hydroxide | 15 | 15 | 65 |
| 30% IPA solution of benzotriazole | — | 0.3 | — |
| Viscosity of composition (mPa · s) | 150000 | 150000 | 180000 |
| Physical characteristics | | | |
| Hardness (JIS-A) | 40 | 40 | 40 |
| Tensile strength (kgf/cm$^2$) | 50 | 50 | 50 |
| Elongation (%) | 500 | 550 | 550 |
| Tensile rupture strength (A) (kgf/cm) | 15 | 15 | 12 |
| High-voltage electrical insulating characteristics (Tracking resistance) | | | |
| Determination A (min) | more than 360 | more than 360 | 40 |
| Determination B (min) | 200 | more than 360 | 50 |
| Erosion | Moderate | Minor | Major |

We claim:

1. A silicone rubber composition for use in high-voltage electrical insulating parts comprising:
   (A) 100 parts by weight of a polyorganosiloxane comprising at least two alkenyl groups bonded to silicon atoms in each molecule,
   (B) 1 to 60 parts by weight of fumed silica with a specific surface area of 50 m$^2$/g or greater,
   (C) a polyorganohydridosil*oxane comprising at least two hydrogen atoms bonded to silicon atoms in each molecule in an amount such that the ratio of the number of moles of hydrogen atoms bonded to silicon atoms in component C) to the number of moles of alkenyl groups bonded to silicon atoms in component (A) is in the range of 0.5:1 to 20:1,
   (D) a catalytic amount of a platinum type catalyst,
   (E) 1 to 150 parts by weight of finely powdered aluminum hydroxide, and
   (F) 1 to 150 parts by weight of a finely powdered metal compound selected from the group consisting of finely powdered zinc oxide, powdered zinc borate and powdered magnesium hydroxide.

2. A silicone rubber composition according to claim 1 further comprising (G) 0.001 to 1 part by weight of a triazole compound.

3. A method for making a liquid silicone rubber composition for use in high-voltage electrical insulating parts comprising forming a silicone rubber base composition comprising (A) 100 parts by weight of a polyorganosiloxane comprising at least two alkenyl groups bonded to silicon atoms in each molecule, (B) 1 to 60 parts by weight of fumed silica with a specific surface area of 50 m$^2$/g or greater, (E) 1 to 150 parts by weight of finely powdered aluminum hydroxide, and (F) 1 to 150 parts by weight of a finely powdered metal compound selected from the group consisting of finely powdered zinc oxide, powdered zinc borate, and powdered magnesium hydroxide and adding to the silicone rubber base composition (C) a polyorganohydridosiloxanc comprising at least two hydrogen atoms bonded to silicon atoms in each molecule in an amount such that the ratio of the number of moles of hydrogen atoms bonded to silicon atoms in component (C) to the number of moles of alkenyl groups bonded to silicon atoms in component (A) is in the range of 0.5:1 to 20:1, and (D) a catalytic amount of a platinum type catalyst.

4. A method for making a liquid silicone rubber composition for use in high-voltage electrical insulating parts according to claim 3, further comprising adding (G) 0.001 to 1 part by weight of a triazole compound to the silicone rubber base composition.

5. A silicone rubber composition according to claim 1, where component (A) has a viscosity in the range of 100 mPa·s to 100,000 mPa·s at 25° C.

6. A silicone rubber composition according to claim 1, where component (A) has a viscosity in the range of 100 mPa·s to 50,000 mPa·s at 25° C.

7. A silicone rubber composition according to claim 1, where component (A) is a polyorganosiloxane resin.

8. A silicone rubber composition according to claim 1, comprising 10 to 40 parts by weight of the fumed silica per 100 parts by weight of component (A).

9. A silicone rubber composition according to claim 1, where the fumed silica has a specific surface area of 100 $m^2/g$ or greater and is surface-treated with an organosilicon compound selected from the group consisting of organosilanes, organosilazanes, organosiloxane oligomers, and mixtures of these compounds.

10. A silicone rubber composition according to claim 1, where component (C) has a viscosity of 3 mPa·s to 10,000 mPa·s at 25° C.

11. A silicone rubber composition according to claim 1, where the ratio of the number of moles of hydrogen atoms bonded to silicon atoms in component (C) to the number of moles of alkenyl groups bonded to silicon atoms in component (A) is in the range of 0.5:1 to 20:1.

12. A silicone rubber composition according to claim 1, where the ratio of the number of moles of hydrogen atoms bonded to silicon atoms in component (C) to the number of moles of alkenyl groups bonded to silicon atoms in component (A) is in the range of 1:1 to 1:3.

13. A silicone rubber composition according to claim 1 comprising 10 to 100 parts by weight of component (F) per 100 parts of component (A).

14. A silicone rubber composition according to claim 3, where component (A) has a viscosity in the range of 100 mPa·s to 50,000 mPa·s at 25° C.

15. A silicone rubber composition according to claim 3, comprising 10 to 40 parts by weight of the fumed silica per 100 parts by weight of component (A).

16. A silicone rubber composition according to claim 3, where the fumed silica has a specific surface area of 100 $m^2/g$ or greater and is surface-treated with an organosilicon compound selected from the group consisting of organosilanes, organosilazanes, organosiloxane oligomers, and mixtures of these compounds.

17. A silicone rubber composition according to claim 1, where component (C) has a viscosity of 3 mPa·s to 10,000 mPa·s at 25° C.

18. A silicone rubber composition according to claim 3, where the ratio of the number of moles of hydrogen atoms bonded to silicon atoms in component (C) to the number of moles of alkenyl groups bonded to silicon atoms in component (A) is in the range of 0.5:1 to 20:1.

19. A silicone rubber composition according to claim 3 comprising 10 to 100 parts by weight of component (F) per 100 parts of component (A).

* * * * *